3,400,000
SURFACE MODIFIED ELECTROSTATIC ENAMEL POWDERS AND METHOD
Lewis C. Hoffman, Wilmington, Del., assignor to E. I. du Pont de Nemours and Company, Wilmington, Del., a corporation of Delaware
No Drawing. Filed May 17, 1965, Ser. No. 456,487
15 Claims. (Cl. 106—49)

This invention relates to vitreous enamels and particularly to composite vitreous enamels especially suited for use in decorating glass by electrostatic methods, and to their production.

The terms "vitreous enamel" and "enamel" are used herein to mean an enamel in particulate form consisting essentially of a powdered glass frit and an inorganic heat resistant or refractory pigment. When such an enamel is applied to a ceramic object, e.g., a glass object, e.g., in the form of a desired design and cause to be fused thereon, a permanent decoration on the object results.

In electrostatic enamel decorating methods, an electrostatic field established between two oppositely charged electrically conductive surfaces or electrodes is used to effect or assist transfer of dry enamel powder from one of the electrically conductive surfaces or electrodes to the other. The surface to which the particles are transferred may be the object to be decorated (e.g., a hot glass bottle from a bottle molding operation) or an electrically conducting offset plate. If an offset plate is employed, the enamel partcles are passed through a stencil screen having therein a desired design so as to form on the offset plate a powder enamel design which is the mirror image of the design desired on the glass object to be decorated, and the enamel design is then transferred electrostatically from the plate to the object. If no offset plate is to be used, the enamel powder is passed through an electrically conductive stencil screen having therein the desired design and transferred electrostatically directly to the glass object to be decorated, e.g., a hot bottle. In the offset method, the oppositely charged electrodes between which the enamel particles are transferred electrostatically are the offset plate and the glass article; while in the direct method, such electrodes are the stencil screen and the glass article.

In such electrostatic methods, it is highly important if not essential for various reasons that the enamel powder material employed have a fairly definite particle size distribution pattern between the limits of about 1 and 45 microns, preferably about 3 to 30 microns in diameter. The presence of a substantial amount of excessively fine particles, whether pigment or frit particles, i.e., particles of a size substantially below about 3 microns, is particularly objectionable. In view of this and since pigmentation of the decoration is most effective when the particle size of the pigment component of the enamel is substantially smaller than 3 microns, the finely divided pigment particles, e.g., of a particle size of about 0.2 micron, are best composited with frit particles to provide enamel particles of the desired particle size range and pattern. This can be done by chemicalyl bonding the finer pigment particles to the coarser frit particles; by fusedly adhering the pigment particles to such frit particles; or by heating a mixture of the frit and pigment particles to disperse or embed the pigment particles in the frit, then quenching, crushing, ball-milling and size classifying the material to obtain a product consisting of composite pigment/frit particles of the desired particle size characteristics. The frit material used in preparing such composite enamel powders is usually a lead borosilicate glass frit.

It is sometimes desired to apply to and fire onto ceramic or glass surfaces an unpigmented coating, in which case such direct or offset electrostatic methods can be used to apply a powdered lead borosilicate glass frit (unpigmented) having a suitable particle size distribution pattern to the surface to be coated.

Moisture films are normally present on enamel or glass frit powder surfaces, and the presence of continuous moisture films is necessary for the effective transfer of such powders by either the direct or the offset electrostatic method. Such moisture films make the particles conductive and, therefore, transferable; if the powder is maintained under conditions such that such films do not exist, e.g., at temperatures above the boiling point of water, the powder particles become nonconductive and nontransferable. However, unmodified powder may be too conductive and, therefore, too active in the electrostatic transfer process. In that case, their charge is reversed when they strike the surface to be decorated and they are then retransferred to the offset plate or screen stencil. Such retransfer phenomenon may result in the travel of the particles being reversed repeatedly between the surface to be decorated and the offset plate or stencil. The result of such retransfer due to excessive powder activity is seen either as missing areas in the decoration or as a blurred or fuzzy image. The present invention is based upon the discovery that the enamel and frit powders can be modified so as to control their activity in electrostatic decorating methods.

It is accordingly an object of the invention to provide glass frit and enamel powders which have been modified so as to control their activity in electrostatic decorating methods. A particular object is to provide glass frit or enamel powders whose activities in electrostatic decorating methods have been modified to a controlled extent by reaction with controlled amounts of certain hydrocarbyl silicon halides. Still further objects will be apparent from the following description.

The objects of the invention are achieved by uniformly contacting the frit or enamel powder with such an amount of a hydrocarbyl silicon halide of the type defined below as will theoretically cover 10 to 70% of the powder surface. It has been found that powder which has been uniformly contacted with the stated amount of the hydrocarbyl silicon halide will possess improved transfer properties when employed in electrostatic decorating methods.

Since the amount of the hydrocarbyl silicon halide theoretically required to cover 10 to 70% of the powder surface is generally less than 1% of the weight of the powder, it is most convenient that the required small amount of hydrocarbyl silicon halide be employed in diluted form. The diluent may be any fluid medium, i.e., gaseous or liquid, which is inert towards both the hydrocarbyl silicon halide and the frit or enamel powder under the conditions of use. The concentration of the hydrocarbyl silicon halide in the diluent is not particularly important; however, it should not be so great as to preclude substantially uniform distribution of the hydrocarbyl silicon halide throughout the frit or enamel powder during the contacting operation. The powder may be contacted with the hydrocarbyl silicon halide by tumbling the powder in a gaseous mixture of the required amount of the hydrocarbyl siilcon halide (vapors) and an inert gas such as air or nitrogen. Preferably, the powder is agitated in a dilute solution of the required amount of the hydrocarbyl silicon halide in an inert volatile solvent such as benzene, toluene, xylene, heptane and the like. Effective agitation can be realized by simply stirring under reflux a mixture of the powder and the solution, following which the treated powder is separated from the solvent and dried. Since reaction between the powder and the hydrocarbyl silicon halide occurs rapidly, the time of contact can be short, even at room or lower temperatures. Contact times of from 1 to 60 minutes are generally effective.

The reaction between the powder and the hydrocarbyl silicon halide is not entirely understood but it does involve the liberation of hydrogen halide. It is well known that frit and enamel powders which have been exposed to air under normal atmospheric conditions will contain small amounts of strongly adhered water, and it is thought that the hydrocarbyl silicon halide reacts with such adhered water to release hydrogen halide and leave on the powder surface a strongly adherent or chemically bonded reaction product, which is not electrically conductive. However, since the amount of hydrocarbyl silicon halide used is sufficient to cover only 100 to 70% of the powder surface, only the covered portion of the powder surface will be rendered nonconductive. Furthermore, the portion of the surface which is rendered nonconductive appears to consist of many small discrete areas distributed more or less uniformly over the particle surface. However, regardless of reaction mechanism, the effect of the treatment of the powder with the hydrocarbyl silicon halide is to give a modified powder possessing distinctly improved behavior when used in electrostatic decorating methods.

The hydrocarbyl silicon halides which are suitable for modifying frit and enamel powders in accordance with the invention are those represented by the formula, $R_3SiX$, wherein X is chlorine or bromine, and each R, considered individually, may be chlorine, bromine or a hydrocarbyl radical (containing only carbon and hydrogen atoms) which radical may be: (1) a 1 to 6 carbon saturated or unsaturated aliphatic radical, such as the methyl, ethyl, propyl, butyl, amyl, hexyl and vinyl radicals; (2) a 6 to 9 carbon aryl radical such as the phenyl and alkyl substituted phenyl radicals, e.g., the methyl-, ethyl-, propyl-, dimethyl- and trimethylphenyl radicals; and (3) a 6 to 9 carbon aralkyl radical such as the tolyl and xylyl radicals. However, at least one of the 3 R's in the above formula must be a hydrocarbyl radical. Stated differently, not more than 2 of the R's can be chlorine or bromine.

Specific examples of the hydrocarbyl silicon halides which are suitable for use in modifying frits and enamels in accordance with the invention are: vinyl silicon trichloride (vinyltrichlorosilane, $CH_2=CHSiCl_3$), trimethyl silicon chloride (trimethylchlorosilane, $(CH_3)_3SiCl$), dimethyl silicon dichloride (dimethyldichlorosilane, $(CH_3)_2SiCl_2$), methyl silicon trichloride (methyltrichlorosilane, $CH_3SiCl_3$), ethyl silicon trichloride (ethyltrichlorosilane, $C_2H_5SiCl_3$), phenyl silicon trichloride (phenyltrichlorosilane, $C_6H_5SiCl_3$), tolyl silicon trichloride (tolyltrichlorosilane, $C_6H_5CH_2SiCl_3$), ditolyl silicon dichloride (ditolyldichlorosilane, $(C_6H_5CH_2)_2SiCl_2$), xylyl silicon trichloride (xylyltrichlorosilane,

$CH_3C_6H_4CH_2SiCl$), and the corresponding bromo compounds.

Patnode U.S. Patent 2,306,222 discloses treating glass surfaces with organo-silicon halide vapors to render such surfaces water repellant. However, the modified powders of the present invention are not water repellant, and if the frit or enamel powder is treated with sufficient of the hydrocarbyl silicon halide to render the powder surface water repellant, the powder becomes inactive in electrostatic processes, apparently because the powder will not absorb sufficient moisture to impart surface conductivity to the powder particles.

The dependence of the surface electrical conductivity of glass on adsorbed moisture films is well known. At room temperatures, the only measurable conductivity in massive glass is that due to surface moisture films; the alkali ion mobility in the glass is too low for noticeable effect until temperatures of about 300–400° C. are reached. The fact that frit and enamel powders must possess some degree of surface conductivity to be active or transportable in electrostatic decorating processes is evident from the fact that unmodified powders are completely inactive in such processes unless employed under relative humidities high enough to allow moisture films to be adsorbed.

A minimum relative humidity of about 30–40% is generally required. However, at very high relative humidities, e.g., above about 80%, the activity of unmodified powder becomes excessive, so that if the powder is in the form of an image on an offset plate with a potential of about 2,500 volts on the plate, it will frequently transfer to the nearest ground before transfer to the glass object to be decorated is effected. In direct electrostatic processes in which the powder particles are propelled electrostatically through a considerable air gap, particle to particle repulsion leads to particle paths which are somewhat divergent from source to receiving surface. Such divergence is greater the lower the electrical resistance of the powder, and the resistance of the powder is lower at high relative humidities. Thus, powders which become excessively active due to high relative humidities, which increase their conductivity or lower their resistance, are transported or transferred more divergently than less active powders, and when the powder activity is sufficiently high for "retransfer" of the powder particles between the electrode surfaces to occur, the divergence of the particle paths increases. The fidelity of the final decorated area or "image" on the surface to be decorated is thus related to the divergence of the particle paths and the amount and extent of particle "retransfer." Obviously, a scattering of the image, which is readily apparent when the particle "retransfer" phenomenon is encountered, is highly undesirable.

The electrical resistance of frit or enamel powder beds or images can be measured by means of an electrode on top of the bed or image and one below. The resistance is best measured with an electrometer like the Keithley model 810A, or a megohm bridge like the General Radio model 544B. Both of these instruments are designed for measuring high resistances. It is found, with 1 square centimeter electrodes, that powder with a resistance greater than about $10^{10}$ ohms measured by use of such instruments, is inactive. Incidentally, such instruments can be used to demonstrate that powder conductivity is dependent upon or sensitive to relative humidity.

The modified frit and enamel powders of the invention have resistances when determined as indicated above of less than $5 \times 10^9$ ohms, and they are substantially less sensitive to water vapor than are the unmodified powders. Because of their reduced sensitivity to water vapor, they may be used at high humidities without particle "retransfer" difficulties and with resultant greater image fidelity than when unmodified powders are employed under the same conditions. However, when treating the powder with the hydrocarbyl silicon halide, it is important that the amount of the latter employed be that amount which would theoretically cover from 10 to 70%, preferably 40 to 60%, of the powder surface. If less than 10% is employed, the improvement in powder properties resulting from the treatment is generally insufficient to warrant the cost of the treatment. If substantially more than 70% is employed, the powder will not be sufficiently conductive for effective transfer and, furthermore, image scattering becomes excessive when excessively high potentials are used to force transfer. When the powder is treated with a large excess of the hydrocarbyl silicon halide, the resistance of the powder becomes sufficiently high that the powder may be regarded as being essentially nonconductive, regardless of the relative humidity. It will also be inactive, i.e., essentially nontransferable, in electrostatic processes except at excessively and impractically high voltages.

As indicated previously, the fidelity of the powder images transferred from one electrode, e.g., a transfer plate, to an oppositely charged electrode which is the glass surface to be decorated, is related to the divergence of particle paths because of the divergence of the electric field between the transfer plate and the glass surface, and to the amount and extent of particle "retransfer" which occurs. A test for evaluating powder image fidelity was developed which involved placing a small circle (⅛ in.

in diameter) image of enamel powder, 1/16 in. thick, on an aluminum transfer plate. A hot (300° C.) glass receiving surface was positioned 1/4 in. from the plate and insulated therefrom. The aluminum plate was connected to the plus side of a high voltage power supply and the glass surface was connected to ground. The voltage on the aluminum plate was steadily increased until it was sufficient to levitate the powder image from the plate and deposit it on the hot glass surface. A judgment was then made of the amount of powder transferred and the fidelity of the transferred image. The results of a number of tests carried out in this manner are reported in the examples below.

The enamel powder employed in the examples was a composite product whose particles consisted of lead borosilicate frit particles having fusedly adhered thereto titanium oxide pigment particles of a particle size of about 0.2 micron with the titanium oxide pigment constituting about 10% of the enamel weight. The powder has been classified so as to consist of particles falling into particle size fractions of 2.25, 7, 12, 17 and 22 microns in diameter. From the density (4.3 g./cc.) of the enamel powder and the particle size and weight percent for each fraction, the values shown in columns (3) and (4) and (5) of Table 1 were calculated. The values in column (3) are the numbers of particles in each size fraction when the total numbers of particles for all fractions equal 100. The values in column (4) are the total particle surface area for each fraction when the numbers of particles for all fractions equal 100. The values in column (5) are the total weights of the particles for each fraction when the numbers of particles for all fractions equal 100.

TABLE 1

| (1) Dia. of particles in fraction, microns | (2) Weight percent | (3) No. of particles | (4) Area of particles, sq. microns | (5) Weight of grams particles |
| --- | --- | --- | --- | --- |
| 2.25 | 4.2 | 26.47 | 421 | $679 \times 10^{-12}$ |
| 7 | 44.8 | 60.09 | 9,250 | $46,405 \times 10^{-12}$ |
| 12 | 40.0 | 12.31 | 5,569 | $48,422 \times 10^{-12}$ |
| 17 | 10.0 | 1.08 | 981 | $11,946 \times 10^{-12}$ |
| 22 | 1.0 | 0.05 | 76 | $1,198 \times 10^{-12}$ |
| | 100.0 | 100.00 | 16,297 | $108,650 \times 10^{-12}$ |

Since the total of column (4) is the total surface area of all particles in all fractions when the total numbers of particles is 100, while the total of column (5) is the total weight of all particles in all fractions when the total number of particles is 100, the average surface area of the particles in one gram of powder is:

$$\frac{16,297 \times 10^{-12}}{108,658 \times 10^{-12}} = 0.15 \text{ square meter/g.}$$

The average area of a molecule of vinyl silicon trichloride is calculated to be 30 square angstroms. Dividing the above powder area by the molecule area gives $0.05 \times 10^{19}$ molecules to theoretically cover the surface of one gram of powder. Multiplying this molecule area by 163 (the molecular weight, in grams, of vinyl silicon trichloride) and dividing by $6 \times 10^{23}$ (the number of molecules in a gram molecular weight) gives a value of 0.000163 gram as the amount of vinyl silicon trichloride theoretically required to just cover the surface of one gram of the powder. Corresponding amounts can be readily calculated for other hydrocarbyl silicon halides which are usable in modifying frit and enamel powders in accordance with the invention.

Seven 100 gram samples of the enamel powder considered in the above calculations were suspended in about 500 cc. portions of xylene containing the amounts of vinyl silicon trichloride (VST) shown in Table 2, which amounts were those calculated to be required to cover the percentages of the powder surface also shown in Table 2, following which the suspensions were refluxed under agitation for 30 minutes. The powders were filtered from the suspensions, washed with xylene and dried. They were then tested in the previously described levitation cell at a relative humidity of about 60%. The results are reported in Table 2.

TABLE 2

| Ex. No. | Grams VTS/100 g. powder | Percent surface covered | Volts req'd. to levitate 1/4 in. | Percent powder transferred | Amount of scatter |
| --- | --- | --- | --- | --- | --- |
| 1 | 0.00163 | 10 | 2,000 | 80 | V. little. |
| 2 | 0.0082 | 50 | 3,000 | 95 | Essent. none. |
| 3 | 0.0163 | 100 | 5,000 | 40 | V. bad. |
| 4 | 0.0326 | 200 | 3,000 | 30 | Moderate. |
| 5 | 0.0489 | 300 | 4,000 | 10 | Not rated. |
| 6 | 0.0815 | 500 | 3,000 | 10 | do |
| 7 | 0.163 | 1,000 | 4,000 | 5 | do |

It will be seen from the above data that treatment of the powder with an amount of VST theoretically required to cover about 50% of the powder surface gave optimum results both from the standpoint of powder transferred and the extent of image scattering. Experience has indicated that the amount of hydrocarbyl silicon halide used should not exceed that amount theoretically required to cover 70% of the surface, since larger amounts excessively reduce the conductivity and, therefore, the transferability of the powder and excessively increase image scattering. On the other hand, the desired beneficial effect of decreasing powder sensitivity to high humidities is not realized to a worthwhile extent when the amount of the hydrocarbyl silicon halide used is substantially less than that amount which is theoretically required to cover 10% of the powder surface.

Example 8

The $TiO_2$-pigmented enamel powder considered in the calculations for Table 1 was treated with 0.130 g. of trimethyl silicon chloride in xylene as described above. That amount was sufficient to have covered 1000% of the powder surface. The treated powder was found to be inactive when used in an offset electrostatic decorating method.

Example 9

Example 8 was repeated except that 0.0082 g. of the trimethyl silicon chloride was used to treat 1,100 g. of the enamel powder. That amount of the trimethyl silicon chloride was sufficient, theoretically, to cover 50% of the powder surface. The treated powder transferred well in the offset method with very little image scattering.

Example 10

The $TiO_2$-pigmented enamel powder used in the above examples was treated with 0.005 g. of phenyl silicon trichloride per 100 g. of powder. The treatment was effected by refluxing a suspension of the powder in a xylene solution of the phenyl silicon trichloride, as described above. The modified powder transferred well in the offset decorating method with very little image scattering.

In the offset decorating method employed in Examples 8, 9 and 10, grounded glass slides (at 300° C.) were contacted at a relative humidity of about 60% with the powder image on an offset aluminum transfer plate connected to the plus side of a power supply at 3000 volts.

The enamel powder employed in the above examples consisted of particles which were composites of a white $TiO_2$ pigment (about 10%) and a lead borosilicate frit (about 90%). The composition of the frit was:

| | Wt. percent |
| --- | --- |
| PbO | 56.9 |
| $SiO_2$ | 27.1 |
| $B_2O_3$ | 5.5 |
| $TiO_2$ | 0.8 |
| $ZrO_2$ | 4.2 |
| $Na_2O$ | 3.8 |
| ZnO | 1.7 |

The pigment used in such composite enamels will usually constitute about 5 to 20% of the enamel weight, with the balance being essentially frit. The pigment may be any of the usual refractory pigments including titanium dioxide used for whites; the spinels used for blues, blacks, browns and greens; cadmium sulfide used for yellow; and the cadmium sulfoselenides used for red and orange colors.

The glass frit employed, whether pigmented or not, will usually be a lead borosilicate composed of:

| | Wt. percent |
|---|---|
| PbO | 50–80 |
| $SiO_2$ | 10–30 |
| $B_2O_3$ | 5–15 |
| $TiO_2$ | 0–5 |
| $ZrO_2$ | 0–5 |
| $Na_2O$ | 0–5 |
| NaF | 0–5 |
| $PbF_2$ | 0–10 |
| CdO | 0–5 |
| ZnO | 0–20 |

The embodiments of the invention in which an exclusive property or privilege is claimed are as follows:

1. A powder from the group consisting of lead borosilicate frit powders and enamel powders the particles of which are composites of a lead borosilicate frit and a refractory pigment, said powder having been modified to improve its electrostatic transfer properties by uniformly contacting the powder with such an amount of a hydrocarbyl silicon halide as will theoretically cover 10 to 70% of the powder surface, said hydrocarbyl silicon halide having the formula $R_3SiX$ wherein X is a halogen of the group consisting of chlorine and bromine, and each R, considered individually, is from the group consisting of chlorine, bromine, 1 to 6 carbon aliphatic hydrocarbyl radicals, 6 to 9 carbon aryl hydrocarbyl radicals, and 6 to 9 carbon aralkyl hydrocarbyl radicals, with the proviso that at least one of said R's is a hydrocarbyl radical.

2. A powder according to claim 1 which has been contacted with vinyl silicon trichloride.

3. A powder according to claim 1 which has been contacted with trimethyl silicon chloride.

4. A powder according to claim 1 which has been contacted with phenyl silicon trichloride.

5. An enamel powder whose particles are composites of a lead borosilicate frit and a refractory pigment, said powder having been modified to improve its electrostatic transfer properties by contacting the powder with such an amount of a hydrocarbyl silicon halide as will theoretically cover 10 to 70% of the powder surface, said hydrocarbyl silicon halide having the formula $R_3SiX$ wherein X is a halogen of the group consisting of chlorine and bromine, and each R, considered individually, is from the group consisting of chlorine, bromine, 1 to 6 carbon aliphatic hydrocarbyl radicals, 6 to 9 carbon aryl hydrocarbyl radicals, and 6 to 9 carbon aralkyl hydrocarbyl radicals, with the proviso that at least one of said R's is a hydrocarbyl radical.

6. An enamel powder according to claim 5 which has been contacted with vinyl silicon trichloride.

7. An enamel powder according to claim 5 which has been contacted with trimethyl silicon chloride.

8. An enamel powder according to claim 5 which has been contacted with phenyl silicon trichloride.

9. An enamel powder according to claim 5 the particles of which range in size from 1 to 45 microns in diameter.

10. The method of improving the electrostatic transfer properties of a powder of the group consisting of lead borosilicate frit powders and enamel powders the particles of which are composites of a lead borosilicate frit and a refractory pigment, said method comprising uniformly contacting said powder with such an amount of a hydrocarbyl silicon halide as will theoretically cover 10 to 70% of the powder surface, said hydrocarbyl silicon halide having the formula $R_3SiX$ wherein X is a halogen of the group consisting of chlorine and bromine, and each R, considered individually, is from the group consisting of chlorine, bromine, 1 to 6 carbon aliphatic hydrocarbyl radicals, 6 to 9 carbon aryl hydrocarbyl radicals, and 6 to 9 carbon aralkyl hydrocarbyl radicals, with the proviso that at least one of said R's is a hydrocarbyl radical.

11. The method of improving the electrostatic transfer properties of an enamel powder whose particles are composites of a lead borosilicate frit and a refractory pigment, said method comprising uniformly contacting said powder with such an amount of a hydrocarbyl silicon halide as will theoretically cover 10 to 70% of the powder surface, said hydrocarbyl silicon halide having the formula $R_3SiX$ wherein X is a halogen of the group consisting of chlorine and bromine and each R, considered individually, is from the group consisting of chlorine, bromine, 1 to 6 carbon aliphatic hydrocarbyl radicals, 6 to 9 carbon aryl hydrocarbyl radicals, and 6 to 9 carbon aralkyl hydrocarbyl radicals, with the proviso that at least one of said R's is a hydroarbyl radical.

12. The method according to claim 11 wherein the hydrocarbyl silicon halide is dissolved in an inert solvent during its contacting with the powder.

13. The method of claim 11 employing vinyl silicon trichloride.

14. The method of claim 11 employing trimethyl silicon chloride.

15. The method of claim 11 employing phenyl silicon trichloride.

References Cited

UNITED STATES PATENTS

| 3,023,181 | 2/1962 | Te Grotenhuis | 106—308 X |
| 3,099,569 | 7/1963 | Andrews et al. | 106—49 |
| 3,331,777 | 7/1967 | Hoffman | 252—62.1 |

HELEN M. McCARTHY, *Primary Examiner.*

W. SATTERFIELD, *Assistant Examiner.*